United States Patent [19]

Green et al.

[11] 4,220,513
[45] Sep. 2, 1980

[54] EPOXIDE-CONTAINING COMPOSITIONS AND THEIR POLYMERIZATION

[75] Inventors: George E. Green, Stapleford, England: Sheik Abdul-Cader Zahir, Oberwil, Switzerland

[73] Assignee: Ciba-Geigy Corporation, Ardsley, N.Y.

[21] Appl. No.: 4,959

[22] Filed: Jan. 19, 1979

[30] Foreign Application Priority Data

Jan. 20, 1978 [GB] United Kingdom ................. 2598/78

[51] Int. Cl.$^2$ ............................................. C08G 59/66
[52] U.S. Cl. .......................... 204/159.23; 204/159.18; 204/159.22; 204/159.24; 528/101; 525/507; 528/360; 528/367; 528/376
[58] Field of Search ............... 528/101, 135, 360, 376, 528/367; 204/159.22, 159.18, 159.23, 159.24

[56] References Cited

U.S. PATENT DOCUMENTS

| | | | |
|---|---|---|---|
| 2,665,266 | 1/1954 | Wasserman | 260/46 |
| 2,910,455 | 10/1959 | Christenson et al. | 260/47 |
| 3,701,721 | 10/1972 | Lard | 204/159.16 |

*Primary Examiner*—Earl A. Nielsen
*Attorney, Agent, or Firm*—Joseph F. DiPrima; Harry Falber

[57] ABSTRACT

Polymerizable compositions comprise
(a) a compound containing in the same molecule both at least one 1,2-epoxide group and at least two groups chosen from allyl, methallyl, and 1-propenyl groups, e.g., 2,2-bis(3-allyl-4-(glycidyloxy)-phenyl)propane or bis(3-(1-propenyl)-4-(glycidyloxy)phenyl)methane, and
(b) a compound containing at least two mercaptan groups per molecule, e.g., pentaerythritol tetrathioglycollate.

The compositions are caused to polymerize by the action of irradiation or free-radical catalysts. They may, if desired, also contain a heat-curing crosslinking agent for epoxide resins; the epoxide-containing polymers so obtained can be subsequently crosslinked in situ. The compositions are useful in various two-stage operations, such as the production of multilayer printed circuits.

10 Claims, No Drawings

EPOXIDE-CONTAINING COMPOSITIONS AND THEIR POLYMERIZATION

BACKGROUND OF THE INVENTION

This invention relates to compositions containing a polymercaptan and a compound which has both at least two allyl, methallyl, or 1-propenyl groups and at least one epoxide group. It also relates to the polymerisation of such compositions by means of actinic radiation or free-radical catalysts, to the further crosslinking of the polymerised products by means of heat, alone or with heat-curing agents, and to the use of such products as surface coatings, in printing plates, printed circuits, and reinforced composites, and as adhesives.

Epoxide resins, i.e., compounds containing on average more than one 1,2-epoxide group per molecule, can be cured with a wide range of compounds, including amines. Compositions comprising epoxide resins and amines are generally useful as adhesives, but in some cases the onset of "green strength", i.e., tackiness, is not sufficiently rapid, and so jigs, clips or other temporary fasteners have to be used to hold in contact the surfaces which are to be bonded. The use of fasteners to hold the articles together is inconvenient and can result in delays in production on assembly lines. To induce earlier formation of tackiness it has been proposed in British Patent Specification No. 1,460,571 to incorporate in epoxide resin-amine compositions a polymercaptan and certain olefinically-unsaturated compounds. The olefins employed were specified as those having, per average molecule, at least two ethylenic double bonds, each $\beta$ to an atom of oxygen, nitrogen, or sulfur. However, the disclosures were restricted to olefins in which the ethylenic double bonds were each $\alpha$ to a carbonyloxy group and in the form of (i) maleoyl residues of the formula

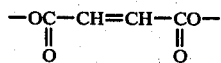

directly attached at each end to carbon atoms, or (ii) itaconoyl residues of the formula

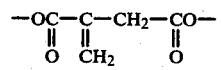

directly attached at each end to carbon atoms, or (iii) acryloyl residues of the formula

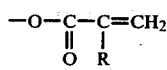

directly attached to carbon atoms, where R denotes a hydrogen, chlorine, or bromine atom or an alkyl group of 1 to 4 carbon atoms.

For a number of reasons, it has become desirable to induce polymerisation of synthetic resin compositions by means of actinic radiation. Employing photopolymerisation procedures may, for example, avoid the use of organic solvents with their attendant risks of toxicity, flammability, and pollution, and the cost of recovering the solvent. Photopolymerisation enables insolubilisation of the resin composition to be restricted to defined areas, i.e., those which have been irradiated, and so permits the production of printed circuits and printing plates or allows the bonding of substrates to be confined to required zones. Further, in production processes, irradiation procedures are often more rapid than those involving heating and a consequential cooling step.

We have now found that valuable products can be made by photopolymerisation of compositions containing a polymercaptan and a compound which contains both an epoxide group and at least two allyl, and/or methallyl, and/or 1-propenyl groups. We have further found that such compositions may also be polymerised by means of free-radical catalysts. The polymerised material, containing residual epoxide groups, may be further crosslinked, i.e., converted into the insoluble, infusible C-stage, by heating, either in the absence (when it is believed that epoxide groups react with any remaining mercaptan groups in the polymercaptan) or, preferably, in the presence, of a heat-activated crosslinking agent for epoxide resins. Hence, a stepwise cure is possible.

DETAILED DISCLOSURE

One aspect of this invention accordingly provides polymerisable compositions comprising (a) a compound containing in the same molecule both at least one 1,2-epoxide group and at least two groups chosen from allyl, methallyl, and 1-propenyl groups and (b) a compound containing at least two mercaptan groups per molecule.

Another aspect of this invention is a process for the polymerisation of such compositions, comprising exposing them to actinic radiation or to the effect of a free-radical catalyst.

It is known that compounds containing allyl groups undergo an addition reaction with polymercaptans, which reaction may be initiated by actinic radiation or by free-radical catalysts (see, e.g., British Patent Specification Nos. 1,215,591, 1,251,232, 1,293,722, 1,445,814, and U.S. Pat. Nos. 3,787,303, 3,877,971, 3,900,594, and 3,908,039). There has been described, for example, such a reaction between polymercaptans and diallyl adipate, 2,2-bis(4-allyloxyphenyl)-propane, 2,4,6-tris(allyloxy)-s-triazine, 2,2-bis(4-(3-diallylamino-2-hydroxypropoxy)-phenyl)propane, and di-adducts of allyl alcohol, diallyl malate, or trimethylolpropane diallyl ether with toluylene-2,4- or -2,6-di-isocyanate, 3,3'-dimethyl-4,4'-di-isocyanatodiphenyl, 3-isocyanatomethyl-3,5,5-trimethylcyclohexyl isocyanate, and 4,4'-methylenebis(cyclohexyl isocyanate). However, the addition of polymercaptans across the double bonds of allyl, methallyl, or 1-propenyl groups in compounds containing at least one epoxide group to form products which can be subsequently crosslinked by another reaction means has not, it is believed, hitherto been described.

Preferably, the compound (a) has at least one epoxide group of the formula

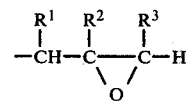

directly attached to an oxygen, sulfur, or nitrogen atom, where either $R^1$ and $R^3$ independently of one another represent hydrogen, in which case $R^2$ denotes hydrogen or methyl, or $R^1$ and $R^3$ conjointly represent —CH$_2$C-

H₂—, in which case R² denotes hydrogen. Further preferred compounds (a) are monoglycidyl or diglycidyl ethers of phenols.

Preferably each allyl, methallyl, or 1-propenyl group is directly attached to an oxygen, nitrogen, or carbon atom, and particularly either to a carbon atom which forms part of an aromatic nucleus or to an oxygen atom which in turn is directly attached to a carbon atom which forms part of an aromatic nucleus.

There may be used products obtained by the advancement of a diglycidyl ether of a dihydric phenol which is substituted in the aromatic nucleus or nuclei by one or more allyl, methallyl, or 1-propenyl groups, using for the advancement a dihydric phenol, a dihydric alcohol, a dicarboxylic acid, or a hydantoin having two free —NH— groups in the hydantoin ring or hydantoin rings. Alternatively, there may be used products obtained by advancement of diglycidyl ethers of dihydric alcohols, diglycidyl ethers of dihydric phenols, diglycidyl esters of dicarboxylic acids, or di(N-glycidyl) hydantoins such as 1,3-diglycidylhydantoin or 3,3'-diglycidyl-1,1'-methylenebis(hydantoin) with a dihydric phenol substituted in the aromatic nucleus or nuclei by one or more allyl, methallyl, or 1-propenyl groups.

Especially preferred as compounds (a) are polyhydric phenols etherified with at least two groups chosen from allyl and methallyl groups and with at least one glycidyl group, or which are polyglycidyl ethers of polyhydric phenols substituted in the aromatic nucleus or nuclei by at least two groups chosen from allyl, methallyl, and 1-propenyl groups, especially by an allyl, methallyl, or 1-propenyl group ortho to each said glycidyl ether group.

The following are examples of such preferred compounds:

2,6-diallylphenyl glycidyl ether and its 4-bromo-, 4-chloro-, and 4-alkyl analogues, the alkyl group containing 1 to 4 carbon atoms;

2,6-dimethallylphenyl glycidyl ether; 2,6-di(1-propenyl)phenyl glycidyl ether;

those of formulae

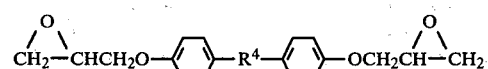

V

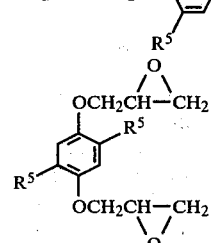

VI

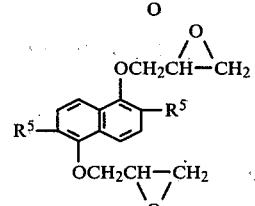

VII

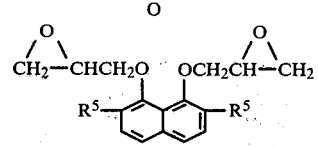

VIII

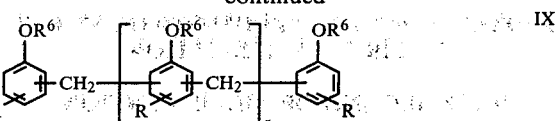

IX or

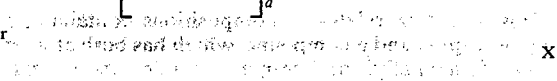

X

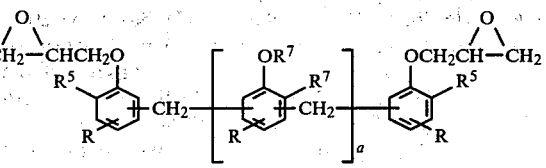

particularly 2,2-bis(3-allyl-4-(glycidyloxy)phenyl)-propane and its 3-(1-propenyl) analogue, bis(3-allyl-4-(glycidyloxy)phenyl)methane and its 3-(1-propenyl) analogue; and allyl, methallyl, or 1-propenyl group-containing products obtained by advancement of a diglycidyl ether of formula

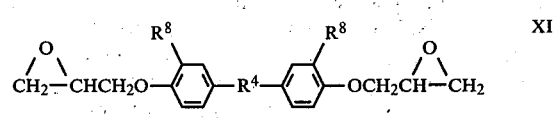

XI with a dihydric phenol of formula

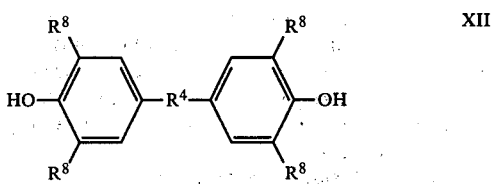

XII or

XIII where

R has the meaning assigned above,

R⁴ denotes a carbon-carbon bond, an alkylene group of 1 to 5 carbon atoms, an ether oxygen atom, a sulfur atom, or a group of formula —CO—, —SS, —SO—, or —SO—₂, a is an integer of at least 1, each R⁵ denotes an allyl, methallyl, or 1-propenyl group, each R⁶ denotes an allyl, methallyl, or glycidyl group, such that at least two groups R⁶ are allyl or methallyl groups and at least one group R⁶ is a glycidyl group, each R⁷ denotes an allyl or methallyl group, and each R⁸ in formula XI to XIII denotes an allyl, methallyl, or 1-propenyl group or a hydrogen atom such that at least one group R⁸ in formula XI taken with either formula XII or formula XIII represents an allyl, methallyl, or 1-propenyl group, with the proviso that, in formulae IX and X, each —CH₂— shown is ortho or para to, respectively, a group —OR⁶, —OR⁷, or

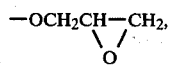

particularly products obtained by advancement of 2,2-bis(4-glycidyloxyphenyl)propane or bis(4-glycidyloxyphenyl)methane with 2,2-bis(3-allyl-4-hydroxyphenyl)propane, bis(3-allyl-4-hydroxyphenyl)methane, or with their 3-(1-propenyl) analogues.

Compounds such as those of formula V to VIII are obtainable by conversion of the corresponding unsubstituted phenols (those of formula XIV

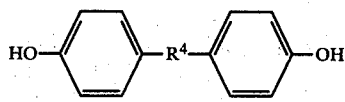

XIV where $R^4$ has the meaning previously assigned, hydroquinone, and 1,5- or 1,8-dihydroxynaphthalene) into their diallyl or dimethallyl ethers, e.g., by means of allyl chloride or methallyl chloride, Claisen rearrangement to the ortho-allylphenol or ortho-methallylphenol, optionally, isomerisation of the ortho-allylphenol into the ortho-b 1-propenylphenol by heating in the presence of a strong alkali, and, finally, reaction with epichlorohydrin and dehydrochlorination to form the glycidyl ether of the allyl-, methallyl-, or 1-propenyl-phenol.

Methods for forming glycidyl ethers of phenols are well known (see, e.g., "Handbook of Epoxy Resins" by H. Lee and K. Neville, McGraw-Hill Book Co., New York, 1967, Chapter 2, pages 10–12, and Houben-Weyl, "Methoden der Organischen Chemie", Stuttgart, 1963, Vol. 14, Part 2, pages 468–470). Phenols containing two allyl, methallyl, or 1-propenyl groups in the same phenolic nucleus, such as 2,5-diallylhydroquinone or 2,5-di(1-propenyl)-hydroquinone, required for making the compounds of formula VI, may be obtained by etherification with, e.g., allyl chloride, of the ortho-allyl or ortho-methallylphenol followed by a second Claisen rearrangement, and, optionally, isomerisation of allyl groups to 1-propenyl groups through the action of alkali.

Compounds of formula IX are allyl or methallyl ethers and glycidyl ethers of novolaks of formaldehyde and a phenol, obtainable by etherification using, e.g., allyl chloride or methallyl chloride, of residual phenolic hydroxyl groups in such novolaks which have been only partially converted into their glycidyl ethers, or, preferably, by glycidylation of such novolaks which have been partially etherified using allyl or methallyl chloride.

Alternatively, some allyl groups in novolaks which have been etherified with allyl groups may be converted into glycidyl groups by reaction with a peracid.

Compounds of formula X are glycidyl ethers of novolaks from formaldehyde and a phenol, in the production of which at least part of the phenol is an ortho-allylphenol, an ortho-methallylphenol, or an ortho-1-propenylphenol, or they are glycidyl ethers of novolaks from formaldehyde and a phenol, which novolaks have been etherified with allyl or methallyl groups and then subjected to a Claisen rearrangement.

The advancement of diglycidyl compounds with dihydric phenols is likewise a generally known reaction (see, e.g., H. Batzer and S. A. Zahir, J. Appl. Polymer Sci., 1975, 19, 585–600, and H. Lidarik, Kunststoff Rundschau, 1959, 4, 6–10) and can be used to prepare allyl-, methallyl-, and 1-propenyl- containing epoxides of the type used in this invention.

A wide range of polymercaptans is suitable for use as component (b) in the compositions of this invention. Preferably the polymercaptans are free from any allyl, methallyl, 1-propenyl, or epoxide group, and preferably they have a molecular weight of not more than 3,000. The polymercaptans employed generally contain not more than six mercaptan groups per molecule.

One class comprises esters of monomercaptancarboxylic acids with polyhydric alcohols or of monomercaptanmonohydric alcohols with polycarboxylic acids.

Further preferred such esters are of the formula

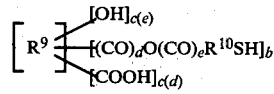

XV where $R^9$ represents an aliphatic or araliphatic hydrocarbon radical of from 2 to 60 carbon atoms, which may contain not more than one ether oxygen atom, $R^{10}$ represents a hydrocarbon radical, which may contain not more than one carbonyloxy group, and is preferably of from 1 to 4 carbon atoms, b is an integer of from 2 to 6, c is zero or a positive integer of at most 3, such that (b+c) is at most 6 (terms such as c(d) being construed algebraically), and d and e each represent zero or 1, but are not the same.

Yet further preferred esters are polymercaptans of formula XV which are also of the formula $$R^{11}(OCOR^{12}SH)_b \qquad XVI$$

where b has the meaning previously assigned, $R^{11}$ is an aliphatic hydrocarbon radical of from 2 to 10 carbon atoms, and $R^{12}$ denotes $-CH_2-$, $-(CH_2)_2-$, or $-CH(CH_3)-$.

Also preferred are mercaptan-containing esters, including esters of monomercaptandicarboxylic acids, of formula $$R^{15}\text{-}(O)_d\text{---}CO(O)_e\text{---}R^{13}(O)_e\text{---}CO(O)_d\text{---}R^{14}SH]_f \qquad XVII$$

where d and e have the meaning previously assigned, f is an integer of from 1 to 6, $R^{13}$ represents a divalent organic radical, linked through a carbon atoms thereof to the indicated —O— or —CO— units, $R^{14}$ represents a divalent organic radical, linked through a carbon atom or carbon atoms thereof to the indicated —SH group and —O— or —CO— unit, and $R^{15}$ represents an organic radical, which must contain at least one —SH group when f is 1, linked through a carbon atom or carbon atoms thereof to the indicated adjacent —O— or —CO— unit or units.

Preferably, $R^{13}$ denotes, when d is zero, a saturated, aliphatic, unbranched hydrocarbon chain of 2 to 20 carbon atoms, which may be substituted by one or more methyl groups and by one or more mercaptan groups and which may be interrupted by one or more ether oxygen atoms and by one or more carbonyloxy groups; while, when d is 1, $R^{13}$ preferably denotes (i) a saturated aliphatic hydrocarbon group of 2 to 10 carbon atoms, which may bear a mercaptan group, (ii) a cycloaliphatic-aliphatic hydrocarbon group of 5 to 34 carbon atoms, which may contain one or more ethylenically-unsaturated double bonds, or (iii) a mononuclear arylene hydrocarbon group of 6 to 12 carbon atoms.

$R^{14}$ preferably denotes, when d is zero, a saturated aliphatic hydrocarbon group of 1 to 3 carbon atoms, which may bear a carboxyl group, and, when d is 1, it preferably denotes a saturated aliphatic hydrocarbon group of 2 to 4 carbon atoms, which may be substituted by a hydroxyl group or by a chlorine atom.

$R^{15}$ preferably denotes (iv) an alipatic or cycloaliphatic-aliphatic hydrocarbon group of 2 to 51 carbon atoms, which may bear at least one mercaptan group, or (v) a mononuclear or dinuclear arylene hydrocarbon group of 6 to 15 carbon atoms, or (vi) a chain of 4 to 20 carbon atoms, interrupted by at least one ether oxygen atom and optionally substituted by at least one mercaptan group, or (vii) a chain of 6 to 50 carbon atoms, interrupted by at least one carbonyloxy group, optionally interrupted by at least one ether oxygen atom, and optionally substituted by at least one mercaptan group.

Also suitable are esters and ethers which are of the general formula

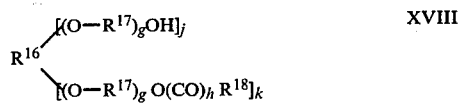  XVIII where $R^{16}$ represents the radical of a polyhydric alcohol after removal of (j+k) alcoholic hydroxyl groups, especially an aliphatic hydrocarbon radical of from 2 to 10 carbon atoms, each $R^{17}$ denotes an alkylene group containing a chain of at least 2 and at most 6 carbon atoms between consecutive oxygen atoms, g is a positive integer, preferably such that the average molecular weight of the polymercaptan is not more than 2,000, h is zero or 1, j is zero or a positive integer such that (j+k) is at most 6, k is an integer of from 2 to 6, and $R^{18}$ represents an aliphatic radical of 1 to 6 carbon atoms, containing at least one mercaptan group.

The groups $R^{17}$ in individual poly(oxyalkylene) chains may be the same or different and they may be substituted by, e.g., phenyl or chloromethyl groups. Preferably they are $-C_2H_4-$ or $-C_3H_6-$ groups.

Preferred amongst the compounds of formula XVIII are the esters of formula

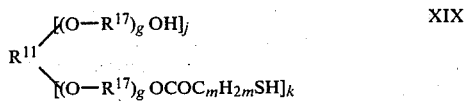  XIX and ethers of formula

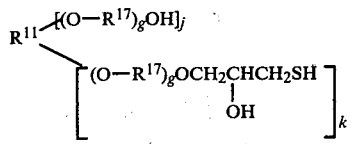  XX where $R^{11}$, $R^{17}$, g, j, and k have the meanings previously assigned and m is 1 or 2.

Yet other suitable polymercaptans are mercaptan-terminated sulfides of the general formula

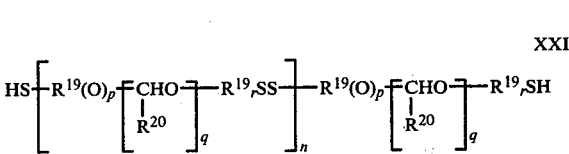  XXI where each $R^{19}$ denotes an alkylene hydrocarbon group containing from 2 to 4 carbon atoms, $R^{20}$ denotes $-H$, $-CH_3$, or $-C_2H_5$, n is an integer which has an average value of at least 1, and is preferably such that the average molecular weight of the sulfide is at most 1000, and either p is zero, in which case q and r are each also zero, or p is 1, in which case q is zero or 1 and r is 1.

The preferred sulfides of formula XXI are those where $R^{20}$ denotes a hydrogen atom and p and q are each 1, n being such that the molecular weight of the sulfide is from 500 to 800.

Another class of suitable polymercaptans comprises mercaptan-terminated poly(butadienes) of the formula

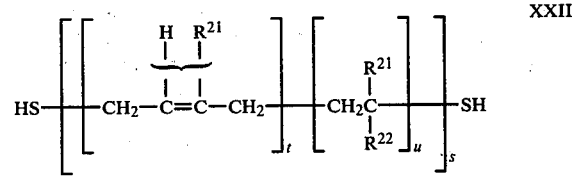  XXII where each $R^{21}$ represents $-H$ or $-CH_3$, $R^{22}$ represents $-CN$, $-COOH$, $-CONH_2$, $-COOR^{23}$, $-C_6H_5$, or $-OCOR^{23}$, where $R^{23}$ is an alkyl group of one to eight carbon atoms, t is an integer of at least one, u is zero or a positive integer, and s is an integer of more than one, preferably such that the average number molecular weight of the polymercaptan is not more than 1000.

Preferably the polymercaptans of formula XXII are also of the formula

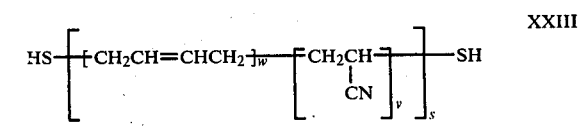  XXIII where v is either zero, in which case w is 1, or it is 1, in which case w is an integer of from 2 to 5, and s has the meaning previously assigned.

Yet another suitable class of polymercaptans comprises the mercaptan-terminated oxyalkylene compounds of the general formula

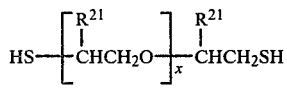   XXIV where
each $R^{21}$ has the meaning previously assigned and
x is an integer of from 1 to 4.

A still further class comprises poly(thioglycollates) and poly(mercaptopropionates) of tris(2-hydroxyethyl) isocyanurate and tris(2-hydroxypropyl) isocyanurate, i.e., the compounds of formula

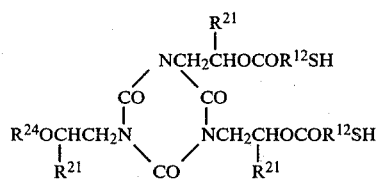   XXV where
each $R^{12}$ and $R^{21}$ have the meanings previously assigned and
$R^{24}$ denotes -H or a group -$COR^{12}SH$.

Particularly preferred polymercaptans are poly(thioglycollates) and poly(2- or 3-mercaptopropionates) of aliphatic polyhydric alcohols of 2 to 6 carbon atoms.

The proportion of (a) to (b) in the present compositions may vary within wide limits but is preferably such that (a) provides a total of from 0.4 to 2.4, and especially 0.8 to 1.2, equivalents selected from allyl, methallyl, and 1-propenyl group equivalents per mercaptan group equivalent in (b).

In photopolymerising the compositions of this invention, actinic radiation of wavelength 200–600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable composition will depend upon a variety of factors which include, for example, the individual compounds used, the type of light source, and its distance from the irradiated composition. Suitable times may be readily determined by those familiar with photopolymerisation techniques, but it is preferred that the products after photopolymerisation remain further crosslinkable by heating; for this reason polymerisation is preferably carried out at a temperature below that at which thermal crosslinking through the epoxide groups becomes substantial.

Preferably, for photopolymerisation, the composition contains a photoinitiator, i.e., a catalyst which, on irradiation, gives an excited state that leads to formation of free radicals which then initiate polymerisation of the composition. Examples of suitable photoinitiators are organic peroxides and hydroperoxides, α-halogen substituted acetophenones such as trichloromethyl 4'-tert.-butylphenyl ketone, benzoin and its alkyl ethers (e.g., the n-butyl ether), α-methylbenzoin, benzophenones such as benzophenone itself and 4,4'-bis(dimethylamino)benzophenone, O-alkoxycarbonyl derivatives of an oxime of benzil or of 1-phenylpropane-1,2-dione, such as benzil (O-ethoxycarbonyl)-α-monoxime and 1-phenylpropane-1,2-dione-2-(O-ethoxycarbonyl)oxime, benzil acetals, e.g., its dimethyl acetal, substituted thioxanthones, e.g., 2-chlorothioxanthone, anthraquinones, and photoredox systems comprising a mixture of a phenothiazine dye (e.g., methylene blue) or a quinoxaline (e.g., a metal salt of 2-(m- or p-methoxyphenyl)-quinoxaline-6'- or 7'-sulfonic acid) with an electron donor such as benzenesulfinic acid, or other sulfinic acid or a salt thereof such as the sodium salt, or an arsine, a phosphine, or thiourea.

Suitable photoinitiators are readily found by routine experimentation. It is preferred that they do not give rise to a substantial degree of photoinduced polymerisation through consumption of epoxide groups, neither should any other substance present; it is further preferred that they do not cause crosslinking of the photopolymerisable composition such that it does not remain substantially thermosettable.

Generally, 0.05 to 10%, and preferably 0.5 to 5%, by weight of the photoinitiator is incorporated, based on the combined weights of the components (a) and (b).

The term "free-radical catalyst" is used herein to refer to substances and does not include actinic radiation. Suitable free-radical catalysts for the polymerisation of the compositions of this invention include 2,2'-azobis(2-methylpropionitrile) and organic or inorganic peroxides, e.g., peracids and their salts and esters, such as peracetic acid, perbenzoic acid, perphthalic acid, di-isopropyl peroxydicarbonate, ammonium or an alkali metal perborate, ammonium or an alkali metal persulfate, acyl peroxides such as benzoyl peroxide, and also, e.g., cumyl peroxide, cumene hydroperoxide, hydrogen peroxide, cyclohexanone peroxide, and ethyl methyl ketone peroxide. A tertiary amine, e.g., dimethylaniline, or a cobalt siccative, e.g., cobalt naphthenate, may be used as an accelerator with the peroxides.

The amount of free-radical catalyst, together with any accelerator therefor, is usually from 0.05 to 5%, and preferably 0.1 to 1%, by weight, calculated on the total of the weights of the components (a) and (b).

Standard methods of free radical catalyst-induced polymerisation can be employed; generally, it is necessary to apply heat, although if complete curing is not required, i.e., the epoxide groups are not to be consumed because some further operation is intended, the maximum temperature to which the composition is subjected is reduced accordingly.

As already indicated, after the composition has been polymerised, it may be further crosslinked through the epoxide groups by heating.

Other aspects of the invention are therefore a process for curing a polymerised composition of this invention which comprises heating it, either in the absence of an added heat-activated crosslinking agent for epoxide resins or, for preference, in the presence of an added heat-activated crosslinking agent for epoxide resins, and the polymerisable compositions of this invention containing a heat-activated crosslinking agent for epoxide resins.

Suitable heat-activated crosslinking agents include polycarboxylic acid anhydrides, dicyandiamide, complexes of amines, such as ethylamine, trimethylamine, and n-octyldimethylamine, with boron trifluoride or boron trichloride, latent boron difluoride chelates, aromatic polyamines such as bis(p-aminophenyl)methane, and imidazoles such as 2-ethyl-4-methylimidazole and 2-phenylimidazole. When the epoxide group in (a) is an N-glycidyl group, the curing agent is preferably not a boron halide-amine complex or other Lewis acid. The heat-curing agent is usually incorporated in the composition before irradiation or subjection to the action of a free radical catalyst.

The compositions of this invention may be used as surface coatings. They may be applied to a substrate such as steel, aluminum, copper, cadmium, zinc, paper, or wood, preferably as a liquid, and polymerised, and preferably they are heated in the presence of a heat-activated crosslinking agent for epoxide resins. By polymerising through irradiation part of the coating, as through a mask, those sections which have not been exposed may be washed with a solvent to remove the unpolymerised portions while leaving the photopolymerised, insoluble portions in place. Thus the compositions of this invention may be used in the production of printing plates and printed circuits. Methods of producing printing plates and printed circuits from photopolymerisable compositions are well known (see, e.g., our British Patent Specification No. 1 495 746). By virtue of the compositions having epoxide groups through which they can be heat-cured after photopolymerisation, they are particularly useful in the production of multilayer printed circuits.

A multilayer printed circuit is prepared from a number of doublesided printed circuit boards of copper, stacked one on top of another and separated from each other by insulating sheets, usually of glass fiber impregnated with an epoxide resin or a phenol-formaldehyde resin in the B-stage. If a heat-curing agent is not admixed with the layer of photopolymerisable resin on the circuit board, it can be incorporated in the insulating layers which alternate with the plates, these layers conveniently being of an epoxide resin prepreg; sufficient of the heat-curing agent contained in the prepreg, providing the latter is not too thick, migrates to induce crosslinking of the photopolymerised epoxide resin. The stack is heated and compressed to bond the layers together. Conventional photopolymerisable materials, however, do not form strong bonds either with copper or with resin-impregnated glass fiber sheets. A stack which is bonded with the photopolymer still covering the copper is therefore inherently weak and in use can become delaminated. It is therefore normal practice to remove the residual photopolymer after the etching stage, either by means of powerful solvents or by a mechanical method, e.g., by means of brushes. Such a stripping process can damage the copper of the printed circuit or the surface of the laminate on which the circuit rests, and so there is a need for a method which would avoid the necessity of removing the photopolymerised material prior to bonding the boards together. The presence of residual epoxide groups in the compositions of this invention means that crosslinking can occur when the boards are bonded, resulting in good adhesion to the copper and to the resin-impregnated glass fiber substrate, so avoiding the necessity just referred to; also, products with a higher glass transition temperature are obtained.

The compositions may also be used as adhesives. Employing irradiation, a layer of the composition may be sandwiched between two surfaces of objects, at least one of which is transparent to the actinic radiation, e.g., of glass. Preferably then the assembly is heated. Or a layer of the composition in liquid form may be irradiated until it solidifies, producing a film adhesive, which is then placed between, and in contact with, the two surfaces which are to be bonded, and heated to complete crosslinking of the composition. The film may be provided on one face with a strippable backing sheet, e.g., of a polyolefin or a polyester, or of cellulosic paper having a coating of a silicone release agent. Manipulation of the assembly is often easier if the film has a tacky surface. This may be produced by coating the film with a substance which is tacky at room temperature but which crosslinks to a hard, insoluble, infusible resin under the conditions of heat employed to complete crosslinking of the composition. However, an adequate degree of tackiness often exists without additional treatment, especially if polymerisation of the composition has not proceeded too far. Suitable adherends include metals such as iron, zinc, copper, nickel, and aluminum, ceramics, glass, and rubbers.

When free-radical catalysts are used to initiate polymerisation, a layer of the composition containing such a catalyst may be placed between, and in contact with, two surfaces to be joined, and the assembly is, if necessary, heated. Alternatively, a film adhesive may be made, but the amount of heat applied must, of course, be carefully controlled so that epoxide groups still remain for thermal cure when the film adhesive is subsequently employed to bond surfaces together.

The compositions are also useful in the production of fiber-reinforced composites, including sheet moulding compounds.

They may be applied directly, in liquid form, to reinforcing fibers (including strands, filaments, and whiskers), which may be in the form of woven or nonwoven cloth, unidirectional lengths, or chopped strands, especially glass, boron, stainless steel, tungsten, alumina, silicon carbide, asbestos, potassium titanate whiskers, an aromatic polyamide such as poly(m-phenylene isophthalamide) or poly(p-phenylene terephthalamide), or poly(p-benzamide), polyethylene, or carbon.

It is not necessary to convert immediately a polymerised composition distributed on the fibers into the fully cured, insoluble, and infusible C-stage; often it can be changed into the still fusible B-stage, or remain in the A-stage, and, when desired, e.g., after stacking to form a multilayer laminate, and/or after the impregnated material has been formed into some desired configuration, fully crosslinked by heating (or further heating). For example, if a hollow shaped article is required, it is convenient to impregnate a continuous tow of fibrous reinforcement and wind the tow around a former while, at the same time, exposing the winding to actinic radiation. Such windings still have a certain degree of flexibility, permitting the former to be removed more easily than when a rigid winding is formed in one step. When required, the so-called filament winding is heated to crosslink the compositions and complete the cure.

Alternatively, the composition may be made into a film adhesive as above, this film is applied to a layer of reinforcing fibers and then the components of the film are caused to flow about the fibrous material by the application of heat and/or pressure.

This latter procedure is particularly convenient when unidirectional fibrous reinforcement is to be used, especially if the fibers are short and/or light, because there is less tendency for the fibers to become displaced and the reinforcing effect thereby become irregularly distributed.

For applying heat and pressure, heated platens or pairs of rollers may be used, for example, and in the latter case, when unidirectional fibers are used, a rolling pressure may be applied in the direction in which the fibers are aligned. In place of pairs of rollers, the assembly may be passed under tension around part of the periphery of a single roller.

The fiber-reinforced composite may be made by a batch process, the fibrous reinforcing material being laid on the film of the polymerised composition, which is advantageously under slight tension, when a second such film may, if desired, be laid on top, and then the assembly is pressed while being heated. It may also be made continuously, such as by contacting the fibrous reinforcing material with the film of the polymerised composition, then, if desired, placing a second such film on the reverse face of the fibrous reinforcing material and applying heat and pressure. More conveniently, two such films, preferably supported on the reverse side by belts or strippable sheets, are applied simultaneously to the fibrous reinforcing material so as to contact each exposed face. When two such films are applied, they may be the same or different.

Multilayer composites may be made by heating under pressure interleaved films and layers of one or more fibrous reinforcing materials. When unidirectional fibers are used as the reinforcement material, successive layers of them may be oriented to form cross-ply structures.

With the fibrous reinforcing material there may be used additional types of reinforcement such as a foil of a metal (e.g., aluminum, steel, or titanium) or a sheet of a plastics material (e.g., an aromatic or aliphatic polyamide, a polyimide, a polysulfone, or a polycarbonate) or of a rubber (e.g., a neoprene or acrylonitrile rubber).

In the production of sheet moulding compounds, a composition of this invention and, if used, the heat-activated crosslinking agent for epoxy resins and the photoinitiator, together with the chopped strand reinforcing material and any other components, are exposed to irradiation in layers through supporting sheets.

The polymerisable composition and, if used, the thermally-activated crosslinking agent, and the photoinitiator or the free-radical catalyst, are preferably applied so that the composite contains a total of from 20 to 80% by weight of the said components, and, correspondingly, 80 to 20% by weight of the reinforcement. More preferably, a total of 30 to 50% by weight of these components and 70 to 50% by weight of the reinforcement are employed.

The compositions of this invention are useful in the production of putties and fillers. They may be used as dip-coatings, an article to be coated being dipped in the liquid composition, withdrawn, and the adhering coating being irradiated to photopolymerise, and hence solidify, it and subsequently, if desired, being heated. Alternatively, the composition may be caused to solidify by activating the free-radical catalyst.

The compositions of this invention may be supplied in the form of two component packs, one containing the unsaturated epoxide (a) and the other the polymercaptan (b). Alternatively, they may be stored mixed until required, protected from actinic radiation and sources of free radicals.

The following Examples illustrate the invention. Parts are by weight and temperatures are in degrees Celsius.

Flexural strengths are the mean of three results and were determined according to British Standard No. 2782, Method 304B. Lap shear strengths are also the mean of three results, and were determined according to the British Ministry of Aviation, Aircraft Materials Specification DTD 5577, of November 1965. Persoz hardness values were determined as described in ISO Recommendation No. 1522.

2,2-Bis(3-allyl-4-(glycidyloxy)phenyl)propane, used in the Examples, was prepared in the following manner.

2,2-Bis(4-hydroxyphenyl)propane (228 g), sodium hydroxide (82.5 g), and n-propanol (1 litre) were heated under reflux, and when all was in solution, allyl chloride (200 ml) was added slowly. After 3 hours the mixture was practically neutral. It was stirred under reflux for a further 3 hours, the precipitated sodium chloride was filtered off, and the n-propanol was removed by distillation. The crude 2,2-bis(4-allyloxyphenyl)propane was taken up in methylene chloride, washed with water and, after separation of the aqueous phase, the methylene chloride was distilled off and the pure diallyl ether remaining was dried over sodium sulfate.

To convert the diallyl ether into 2,2-bis(3-allyl-4-hydroxyphenyl)propane it was heated, as an approximately 50% solution in diethylene glycol monoethyl ether, at 200°–205°. The product was purified by heating it in a rotating evaporator and then by vacuum distillation (b.p. 190°/0.5 mm). The yield of the desired compound was 85%. Microanalysis, and NMR and IR-spectroscopy were used to confirm the structure of the intermediary diallyl ether and the rearranged product.

Next, the diallylbisphenol was converted into its diglycidyl ether in a standard manner by reaction with epichlorohydrin followed by dehydrochlorination. The diglycidyl ether contained 4.5 epoxide equiv./kg and 4.5 allyl double bond equiv./kg.

Bis(3-allyl-4-(glycidyloxy)phenyl)methane and 3,3'-diallyl-4,4'-diglycidyloxydiphenyl can be prepared in the same way, from bis(4-hydroxyphenyl)methane and 4,4'-dihydroxydiphenyl, respectively.

An allyl group-containing advanced resin may be made by the following procedure.

A liquid diglycidyl ether of 2,2-bis(4-hydroxyphenyl)propane of epoxide content 5.15 equiv./kg (1019 g) is heated with 382.7 g of 2,2-bis(3-allyl-4-hydroxyphenyl)propane in the presence of 5 mg of 2-phenylimidazole to 185° in an atmosphere of nitrogen. After 2½ hours a solid advanced resin is formed, having an epoxide content of 2.02 equiv./kg and 1.77 allyl double bond equiv. per kg.

2,2-Bis(3-(1-Propenyl)-4-(glycidyl)phenyl)propane was prepared as follows:

2,2-Bis(3-allyl-4-hydroxyphenyl)propane (1 mole) was mixed with potassium hydroxide pellets (2.2 moles) and the mixture was stirred and heated at 110° for 30 minutes. The mixture was cooled, neutralised with dilute hydrochloric acid, and the product was extracted into methylene chloride. The solution was dried and evaporated to give substantially pure 2,2-bis(3-(1-propenyl)-4-hydroxyphenyl)propane.

Proton NMR and IR-spectroscopy were used to confirm the assigned structure. More detailed investigation, however, using $^{13}C$ NMR showed the presence of minor amounts of isomeric material such as 2-(3-(1-isopropenyl)-4-hydroxyphenyl)-2-(3-(1-isopropenyl)-2-hydroxyphenyl)propane, believed to be formed by thermal scission and recombination of the product.

The bisphenol so obtained was converted into its diglycidyl ether in a standard manner by reaction with epichlorohydrin followed by dehydrochloroination. The diglycidyl ether contained 4.19 epoxide equiv./kg and 4.19 propenyl bond equiv./kg.

2,2-Bis(3,5-diallyl-4-hydroxyphenyl)propane was prepared by conversion of 2,2-bis(3-allyl-4-hydroxyphenyl)propane into its diallyl ether and subjecting this to a Claisen rearrangement as described above. The tetra-allylbisphenol was converted into 2,2-bis(3,5-diallyl-4-(glycidyloxy)-phenyl)propane in a standard manner by reaction with epichlorohydrin followed by dehydrochlorination. The diglycidyl ether so obtained contained 3.92 epoxide equiv./kg and 7.84 allyl double bond equiv./kg.

A Claisen rearrangement carried out upon resorcinol diallyl ether afforded a mixture of the isomers, 1,3-diallyl-2,4-dihydroxybenzene and 1.5-diallyl-2,4-dihydroxybenzene. From this, a mixture of 1,3-diallyl and 1,5-diallyl-2,4-di(glycidyloxy)benzenes was prepared in a standard manner as above.

This mixture of epoxide resins contained 5.76 epoxide equiv./kg and 5.76 allyl double bond equiv./kg.

Bis(3-allyl-4-hydroxyphenyl) sulfide was prepared similarly, from bis(4-hydroxyphenyl) sulfide, and converted in a like manner into its diglycidyl ether (epoxide content, 4.08 equiv./kg, allyl double bond content, 4.08 equiv./kg).

The polymercaptans employed were commercially-available materials, having the following thiol contents:

| Polymercaptan | SH-Equiv./kg |
| --- | --- |
| Dipentaerythritol hexakis(3-mercapto-propionate) | 7.3 |
| Pentaerythritol tetrathioglycollate | 8.8 |
| Trimethylolpropane trithioglycollate | 8.0 |
| Ethylene glycol dithioglycollate | 9.05 |
| Tris(3-mercapto-2-hydroxypropyl ether) of a polyoxypropylene triol of average molecular weight 800 | 3.6 |
| A polysulfide of formula XXVI, below | 2.0 |

EXAMPLE 1

Benzil dimethyl acetal (10 parts) was dissolved in a mixture of 2,2-bis(3-allyl-4-(glycidyloxy)phenyl)propane (100 parts) and dipentaerythritol hexakis(3-mercaptopropionate) (62 parts), i.e., 1 allyl group equivalent per mercaptan group equivalent). The liquid composition was applied as a coating 4 μm thick onto tinplate at room temperature and irradiated under a 500 w medium pressure mercury lamp at a distance of 20 cm. After 15 seconds, a tack-free flexible coating was obtained, and after 1¼ minutes' irradiation the coating was resistant to more than twenty rubs with a cotton wool swab soaked in acetone.

EXAMPLE 2

Example 1 was repeated, except that 5 parts of the boron trichloride complex of n-octyldimethylamine, a latent curing agent for epoxide resins, was added to the initial composition. After 15 seconds' irradiation a tack-free, flexible coating was obtained which was resistant to five rubs with an acetone-soaked cotton wool swab. The coating was heated for 30 minutes at 180°; it was then resistant to more than twenty rubs with a cotton wool swab soaked in acetone.

EXAMPLE 3

Benzophenone (20 parts) was dissolved in a mixture of 2,2-bis(3-allyl-4-(glycidyloxy)phenyl)propane (100 parts) and pentaerythritol tetrathioglycollate (51 parts, i.e., 1 allyl group equivalent per mercaptan group equivalent), and a coating was prepared as described in Example 1. The coating was irradiated under a 1200 w medium pressure mercury lamp at a distance of 22 cm. After 5 seconds the coating was tack-free, and after 20 seconds it was resistant to more than twenty rubs with a cotton wool swab soaked in acetone.

EXAMPLE 4

Very finely ground dicyandiamide (5 parts) was added to a mixture of 2,2-bis(3-allyl-4-(glycidyloxy)-phenyl)propane (100 parts), trimethylolpropane trithioglycollate (56 parts, i.e., 1.0 allyl equivalent per mercaptan equivalent), and benzil dimethyl acetal (1 part). This liquid composition was coated onto a nylon carrier film at room temperature. Irradiation on both sides for 15 seconds under a 400 w high pressure metal halide quartz lamp at a distance of 18 cm gave a tack-free film. The film was cut to size and sandwiched between two sheets of "Alclad 3L 73" aluminum alloy sheets that had been degreased in trichloroethylene and pickled in chromic acid solution ("Alclad" is a Registered Trade Mark). Overlap joints (1.27 cm) were prepared by pressing the assembly under a pressure of 0.34 MN/m$^2$ for one hour at 180°. The lap shear strength of the joints at 25° was 19.5 MN/m$^2$.

EXAMPLE 5

Very finely ground dicyandiamide (5 parts) was added to a mixture of 2,2-bis(3-allyl-4-(glycidyloxy)-phenyl)propane (100 parts), ethylene glycol dithioglycollate (49 parts, i.e., 1 allyl equivalent per mercaptan equivalent), and benzophenone (1.5 parts). This liquid composition was used to make a prepreg by impregnating glasscloth (plain weave, weighing 200 g/m$^2$, having an epoxysilane finish) with it at room temperature, and then exposing the cloth for one minute at a distance of 18 cm on both sides to a 400 w high pressure metal halide-quartz lamp providing radiation predominantly in the 365 nm band.

A good six-ply laminate was prepared from this tack-free prepreg by pressing six 10 cm-square pieces of the prepreg at 180° for 1 hour under an applied pressure of 0.69 MN/m$^2$, allowing a five minute dwell time in the press before applying maximum pressure. The laminate, which consisted of 69.8% of glass, had a flexural strength of 445 MN/m$^2$.

EXAMPLE 6

A liquid composition was prepared by mixing 100 parts of 2,2-bis(3-allyl-4-(glycidyloxy)phenyl)propane, 125 parts of a commercially available tris(3-mercapto-2-hydroxypropyl ether) of a polyoxypropylenetriol, which triol had an average molecular weight of 800 (i.e., 1 allyl equivalent per mercaptan equivalent), and 5 parts of benzil dimethyl acetal. This composition was applied as a coating 4 μm thick onto tinplate, and irradiated as in Example 3. The coating was tack-free after 15 seconds and after 35 seconds it resisted 20 rubs with an acetone-soaked swab.

EXAMPLE 7

A mixture of 100 parts of 2,2-bis(3-allyl-4-(glycidyloxy)phenyl)propane, 51 parts of pentaerythritol tetrathioglycollate (i.e., 1 allyl equivalent per mercaptan equivalent), and 4 parts of 2,2′-azobis(2-methylpropionitrile) was applied as a coating 4 μm thick on aluminum sheets which had been degreased and pickled, and the coated sheets were then heated at 80° for 1 hour. The coating was tack-free and resisted 6 rubs with a swab soaked in acetone.

EXAMPLE 8

A composition was prepared as in Example 7 but also containing 5 parts of dicyandiamide. The coated sheets were heated for 1 hour at 80°, after which time the coating was tack-free. They were then heated for a further 1 hour at 180°, after which the coating was unaffected by 20 rubs with a swab soaked in acetone.

EXAMPLE 9

The procedure of Example 1 was repeated, employing an equal weight of 2,2-bis(3-(1-propenyl)-4-(glycidyloxy)phenyl)propane in place of 2,2-bis(3-allyl-4-(glycidyloxy)phenyl)propane, i.e., 0.93 propenyl equivalent per mercaptan equivalent. The coating was tack-free after 15 seconds' irradiation, and after 90 seconds it was resistant to twenty rubs with a cotton wool swab soaked in acetone.

EXAMPLE 10

Example 9 was repeated except that 5 parts of the boron trichloride complex of n-octyldimethylamine was added. After irradiation for 15 seconds a tack-free coating was obtained which was resistant to four rubs with an acetone-soaked cotton wool swab; after being heated for 30 minutes at 180° it was resistant to more than twenty such rubs.

EXAMPLE 11

A coating was prepared as described in Example 3, employing, however, an equal weight of 2,2-bis(3-(1-propenyl)-4-(glycidyloxy)phenyl)propane, i.e., 0.94 propenyl equivalent per mercaptan equivalent. After irradiation for 10 seconds as in Example 3 a tack-free, flexible coating was obtained and after 25 seconds' irradiation this coating was resistant to more than twenty rubs in the acetone-cotton wool swab test.

EXAMPLE 12

The procedure of Example 4 was repeated, employing 100 parts of 2,2-bis(3-(1-propenyl)-4-(glycidyloxy)phenyl)propane in place of the diallyl compound, i.e., 0.94 propenyl equivalent per mercaptan equivalent, and irradiating at a distance of 15 cm. The lap shear strenth of the joints, measured at 25°, was 19.5 MN/m².

EXAMPLE 13

A tack-free prepreg was made by following the procedure of Example 5, employing, however, 100 parts of 2,2-bis(3-(1-propenyl)-4-(glycidyloxy)-phenyl)propane, i.e., 0.94 propenyl equivalent per mercaptan equivalent, and exposing the impregnated glasscloth at a distance of 15 cm instead of 18 cm. The laminate, which contained 70% of glass, had a flexural strength of 307 MN/m² at 25°.

EXAMPLE 14

A liquid composition was prepared as described in Example 6, with 100 parts of 2,2-bis(3-(1-propenyl)-4-(glycidyloxy)phenyl)propane, i.e., 0.93 propenyl equivalent per mercaptan equivalent. It was applied as a coating 4 μm thick onto tinplate and irradiated under a 1200 W medium pressure mercury lamp at a distance of 22 cm. After 10 seconds the coating so produced was tack-free, and after 30 seconds it resisted more than twenty rubs in the acetone-cotton wool swab test.

EXAMPLE 15

A coating, 6 μm thick, of a mixture consisting of 100 parts of 2,2-bis(3-(1-propenyl)-4-(glycidyloxy)phenyl)propane, 48 parts of pentaerythritol tetrathioglycollate, (i.e., 1 propenyl equivalent per mercaptan equivalent), and 4 parts of 2,2-azobis(2-methylpropionitrile) was applied to aluminum sheets which had been degreased and pickled. The coated sheets were heated at 80° for 1 hour, and the coating was resisted six rubs in the acetone-cotton wool swab test.

EXAMPLE 16

The procedure of Example 15 was repeated, the mixture containing in addition 5 parts of dicyandiamide. The sheets were heated for 1 hour at 80° and for 1 hour at 180°. The hard coating obtained was resistant to more than twenty rubs in the acetone cotton wool swab test.

EXAMPLE 17

Benzophenone (10 parts) was dissolved in a mixture of 2,2-bis(3-allyl-4-(glycidyloxy)phenyl)propane (100 parts) and a difunctional mercaptan polysulfide (225 parts) of average formula

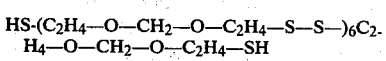

$$HS\text{-}(C_2H_4\text{—}O\text{—}CH_2\text{—}O\text{—}C_2H_4\text{—}S\text{—}S\text{—})_6C_2\text{-}H_4\text{—}O\text{—}CH_2\text{—}O\text{—}C_2H_4\text{—}SH \quad\quad XXVI$$

i.e., 0.93 allyl equivalent per mercaptan equivalent.

The liquid composition was applied as a coating 4 μm thick onto tinplate and irradiated under a 1200 w medium pressure mercury lamp at a distance of 22 cm. The coating was tack-free after 20 seconds and after 35 seconds it was resistant to more than twenty rubs with a cotton wool swab soaked in acetone.

EXAMPLE 18

Benzil dimethyl acetal (10 parts) was dissolved in a mixture of 2,2-bis(3-allyl-4-(glycidyloxy)phenyl)propane (100 parts) and dipentaerythritol hexakis(3-mercaptopropionate) (118 parts, i.e., 0.5 allyl equivlent per mercaptan equivalent). The liquid composition was applied as a coating 6 μm thick onto tin foil at room temperature and irradiated as in Example 1. After 30 seconds, a tack-free flexible coating was obtained, and after two minutes' irradiation the coating was resistant to more than twenty runs in the acetone-cotton wool swab test.

EXAMPLE 19

Example 18 was repeated except that 5 parts of the boron trichloride complex of n-octyldimethylamine was added to the initial composition. After 30 seconds' irradiation a tack-free, flexible coating was obtained which was resistant to five rubs with an acetone-soaked cotton wool swab. The coating was heated for 30 minutes at 180°; it was then resistant to more than twenty rubs with a cotton wool swab soaked in acetone.

EXAMPLE 20

Benzophenone (20 parts) was dissolved in a mixture of 2,2-bis(3-allyl-4-(glycidyloxy)phenyl)propane (100 parts) and pentaerythritol tetrathioglycollate (100 parts, i.e., 0.5 allyl equivalent per mercaptan equivalent), and a coating was prepared as described in Example 18.

After just one minute's irradiation a tack-free flexible coating was obtained which was resistant to more than twenty rubs with an acetone-soaked swab of cotton wool.

EXAMPLE 21

Very finely ground dicyandiamide (5 parts) was added to a mixture of 2,2-bis(3-allyl-4-(glycidyloxy)phenyl)propane (100 parts), trimethylolpropane trithioglycollate (85 parts, i.e., 0.7 allyl equivalent per mercaptan equivalent), and benzil dimethyl acetal (1 part). This liquid composition was coated onto a nylon carrier film and irradiated as described in Example 4, being exposed, however, for 30 seconds. Overlap joints were prepared as in Example 4: the lap shear strength was 2.7 MN/m².

EXAMPLE 22

Example 5 was repeated, using a liquid composition consisting of 2,2-bis(3-allyl-4-(glycidyloxy)phenyl)propane (100 parts), pentaerythritol tetrathioglycollate (99 parts, i.e., 0.5 allyl equivalent per mercaptan equivalent), benzophenone (2 parts), and dicyandiamide (5 parts). The six-ply laminate, which consisted of 66% of glass, had a flexural strength of 241 MN/m².

EXAMPLE 23

A liquid composition was prepared by mixing 100 parts of 2,2-bis(3-allyl-4-(glycidyloxy)phenyl)propane, 128 parts of the polymercaptan used in Example 6 (i.e., 0.97 allyl equivalent per mercaptan equivalent), and 5 parts of benzil dimethyl acetal. This composition was applied as a coating 4 μm thick onto tinplate, and irradiated for 1 minute as in Example 18. A non-tacky, flexible film was obtained.

EXAMPLE 24

A mixture of 5 parts of 2,2-bis(3-allyl-4-(glycidyloxy)phenyl)propane, 4.95 parts of pentaerythritol tetrathioglycollate (i.e., 0.5 allyl equivalent per mercaptan equivalent), and 0.2 part of 2,2'-azobis(2-methylpropionitrile) was applied as a coating 4 μm thick on aluminum sheets which had been degreased and pickled. The coated sheets were heated at 80° for 1 hour and then at 180° for a further hour. The coating was tack-free and resisted more than twenty rubs with an acetone-soaked cotton wool swab. The Persoz hardness was 135 seconds.

EXAMPLE 25

A composition was prepared as in Example 24 but also containing 0.25 part of dicyandiamide. The cured coating resisted more than twenty rubs with an acetone-soaked cotton wool swab, and its Persoz hardness was 160 seconds.

EXAMPLE 26

A mixture of 10 parts of 2,2-bis(3,5-diallyl-4-(glycidyloxy)phenyl)propane, 8.66 parts of ethylene glycol dithioglycollate (i.e., 1 allyl group per mercaptan group), and 0.2 part of benzil dimethyl acetal was applied as a layer 6 μm thick on tin foil. It was irradiated with a mercury arc lamp (80 w per linear cm) at a distance of 22 cm for 8 seconds. The resultant tack-free coating was resistant to more than 20 rubs with a cotton wool swab soaked in acetone.

EXAMPLE 27

A mixture of 10 parts of 2,2-bis(3,5-diallyl-4-(glycidyloxy)propane, 10.8 parts of dipentaerythritol hexakis(3-mercaptopropionate), i.e., 1 allyl group per mercaptan group, 0.5 part of dicyandiamide, and 1 part of benzil dimethyl acetal was applied onto tinplate and irradiated as described in Example 26. The coating was tack-free in only five seconds' irradiation and was resistant to 12 rubs in the acetone-soaked cotton wool swab test. It was heated for 1 hour at 180°, and the resultant film was resistant to more than 20 such rubs.

EXAMPLE 28

A coating, 6 μm thick, consisting of a mixture (10 parts) of 1,3-diallyl-2,4-di(glycidyloxy)benzene and 1,5-diallyl-2,4-di(glycidyloxy)benzene, 16 parts of the polymercaptan used in Example 6, i.e., 1 allyl group per mercaptan group, 1 part of benzil dimethyl acetal, and 0.5 part of dicyandiamide, was applied to tin plate, and irradiated at a distance of 20 cm with a 500 w medium pressure mercury lamp. The coating was tack-free on 25 seconds' irradiation and was resistant to 8 rubs in the acetone-soaked cotton wool swab test. It was heated for 1 hour at 180°, when it resisted more than 20 such rubs.

EXAMPLE 29

A coating, 1 μm thick, consisting of bis(3-allyl-4-(glycidyloxy)phenyl) sulfide (10 parts), dipentaerythritol hexakis(3-mercaptopropionate) (5.6 parts), 1 part of benzil dimethyl acetal, and 0.5 part of dicyandiamide was applied to tinplate and irradiated at a distance of 22 cm with a 1200 w medium pressure mercury lamp. The coating was tack-free after 10 seconds' irradiation, and was resistant to 8 rubs in the acetone-cotton wool swab test. It was then heated for 1 hour at 180° when it resisted more than 20 such rubs.

What is claimed is:
1. Polymerisable compositions comprising
   (a) a compound containing in the same molecule both at least one 1,2-epoxide group and at least two groups chosen from allyl, methallyl, and 1-propenyl groups and
   (b) a compound containing at least two mercaptan groups per molecule in an amount such that (a) provides a total of from 0.4 to 2.4 equivalents selected from allyl, methallyl, and 1-propenyl group equivalents per mercaptan group equivalent in (b).
2. The compositions of claim 1, in which the compound (a) has at least one epoxide group of the formula

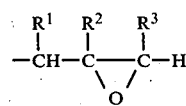

IV directly attached to an oxygen, sulfur or nitrogen atom, where either R¹ and R³ independently of one another represent hydrogen, in which case R² denotes hydrogen or methyl, or $R^1$ and $R^3$ conjointly represent —$CH_2CH_2$—, in which case $R^2$ denotes hydrogen.

3. The compositions of claim 1, in which the compound (a) is a monoglycidyl ether of a monohydric phenol or a diglycidyl ether of a dihydric phenol.

4. The compositions of claim 1, in which each group chosen from allyl, methyl, and 1-propenyl groups in the compound (a) is attached either to a carbon atom which forms part of an aromatic nucleus or to an oxygen atom which in turn is directly attached to a carbon atom which forms part of an aromatic nucleus.

5. The compositions of claim 1, in which the compound (a) is a polyhydric phenol etherified both with at least two groups chosen from allyl and methallyl groups and with at least one glycidyl group, or is a polyglycidyl ether of a polyhydric phenol substituted in the aromatic nucleus or nuclei by at least two groups chosen from allyl, methallyl, and 1-propenyl groups.

6. The compositions of claim 1, wherein the compound (b) is an ester of a monomercaptancarboxylic acid with a polyhydric alcohol or of a monomercaptanmonohydric alcohol with a polycarboxylic acid.

7. The compositions of claim 1, wherein the compound (b) is one of the formulae XVII to XXV

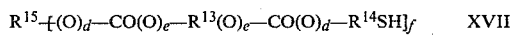   XVII where d and e each represent zero or 1 but are not the same,
f is an integer of from 1 to 6,
$R^{13}$ represents a divalent radical, linked through a carbon atom or carbon atoms thereof to the indicated —O— or —CO— units,
$R^{14}$ represents a divalent organic radical, linked through a carbon atom or carbon atoms thereof to the indicated —SH group and —O— or —CO— unit, and
$R^{15}$ represents an organic radical, which must contain at least one —SH group when f is 1, linked through a carbon atom or carbon atoms thereof to the indicated —O— or —CO— unit;

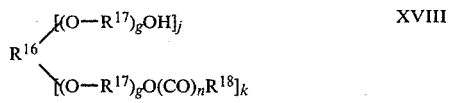   XVIII where $R^{16}$ represents the radical of a polyhydric alcohol after removal of (j+k) alcoholic hydroxyl groups,
each $R^{17}$ denotes an alkylene group containing a chain of at least 2 and at most 6 carbon atoms between consecutive oxygen atoms,
$R^{18}$ represents an aliphatic radical of 1 to 6 carbon atoms, containing at least one mercaptan group,
g is a positive integer,
h is zero or 1,
j is zero or a positive integer such that (j+k) is at most 6, and
k is an integer of from 2 to 6;

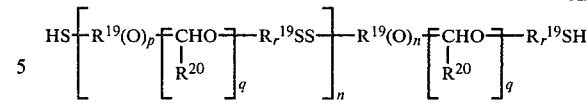   XXI where each $R^{19}$ denotes an alkylene hydrocarbon group containing from 2 to 4 carbon atoms,
$R^{20}$ denotes —H, —$CH_3$, or —$C_2H_5$,
n is an integer which has an average value of at least 1, and
either p is zero, in which case q and r are each also zero, or p is 1, in which case q is zero or 1 and r is 1;

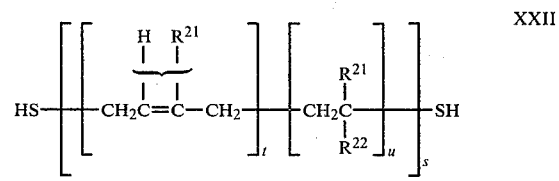   XXII where each $R^{21}$ represents —H or —$CH_3$,
$R^{22}$ represents —CN, —COOH, —$CONH_2$, —$COOR^{23}$, —$C_6H_5$, or —$OCOR^{23}$, where $R^{23}$ is an alkyl group of one to eight carbon atoms,
t is an integer of at least one,
u is zero or a positive integer, and
s is an integer of more than one;

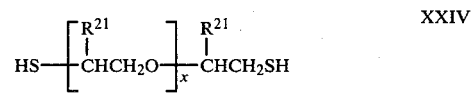   XXIV where each $R^{21}$ represents —H or —$CH_3$ and
x is an integer of from 1 to 4;
or

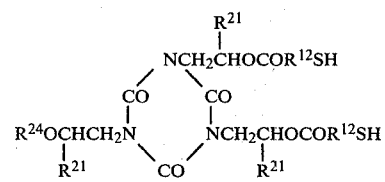   XXV where each $R^{12}$ denotes —$CH_2$—, —$(CH_2)_2$—, or —$CH(CH_3)$—,
each $R^{21}$ denotes —H or —$CH_3$, and
$R^{24}$ denotes —H or a group —$COR^{12}SH$.

8. The compositions of claim 1, which also contain a photoinitiator.

9. The compositions of claim 1, which also contain a free-radical catalyst.

10. The compositions of claim 1, which further contain a heat-activated crosslinking agent for epoxide resins.

* * * * *